March 10, 1936.  C. H. M. ROBERTS  2,033,152
ELECTRIC DEHYDRATION SYSTEM
Filed Jan. 30, 1933
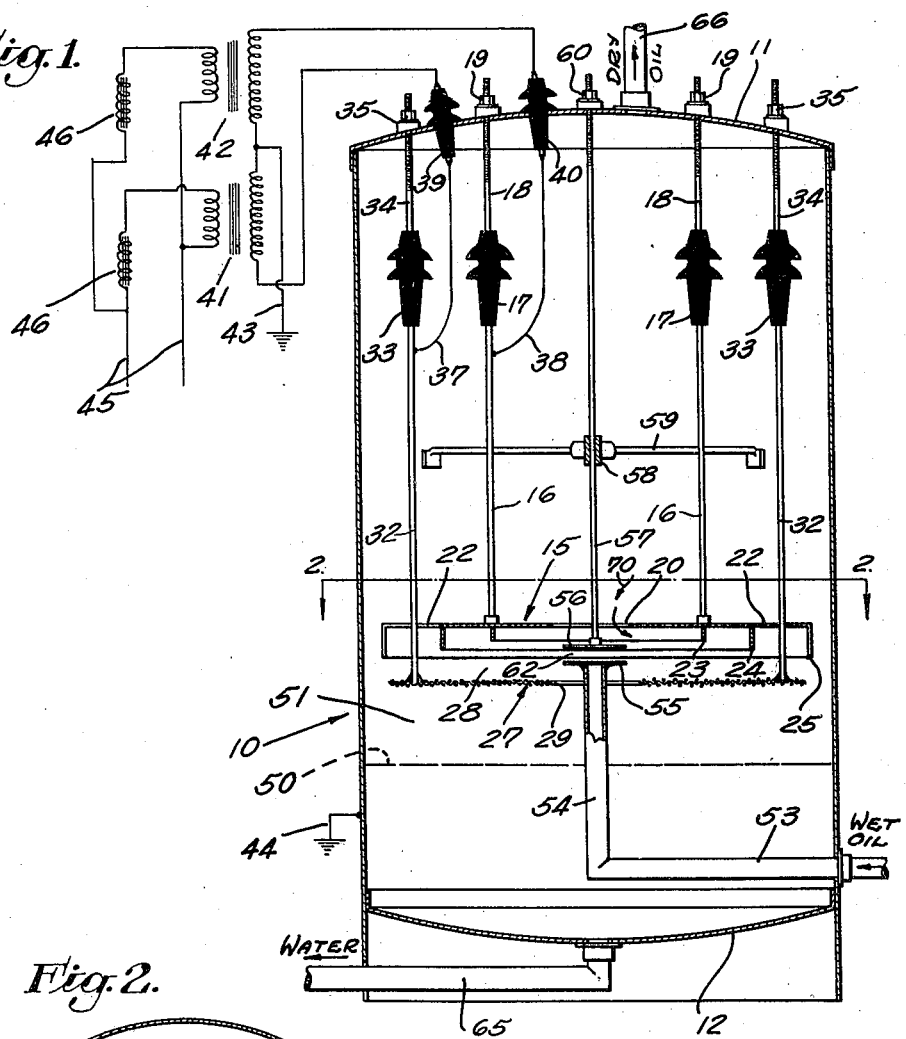
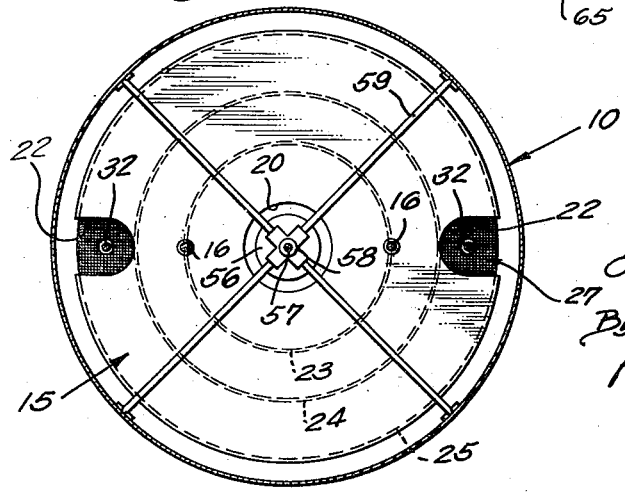
INVENTOR:
CLAUDIUS H.M. ROBERTS,
ATTORNEY.

Patented Mar. 10, 1936

2,033,152

UNITED STATES PATENT OFFICE 2,033,152

ELECTRIC DEHYDRATION SYSTEM

Claudius H. M. Roberts, Long Beach, Calif., assignor to Petroleum Rectifying Company of California, Los Angeles, Calif., a corporation of California Application January 30, 1933, Serial No. 654,175

13 Claims. (Cl. 204—24)

This invention relates to electric treatment of emulsions to effect separation of the constituent phases, and finds particular application in the treatment of petroleum emulsions of the water-in-oil type such as are produced when the crude oil is pumped or flowed from a well. The accompanying description is drafted with particular reference to the treatment of such petroleum emulsions, though it will be clear that the method and apparatus herein disclosed find utility with emulsions of other character.

The treater and method of my invention are particularly valuable when treating emulsions having "sludging" characteristics. Difficulty is often encountered in treating such emulsions with conventional treaters due to this "sludging" tendency which tends not only to counteract the desirable treating action normally present when an emulsion is subjected to a high intensity electric field, but also tends to set up low resistance paths tending to short-circuit the electrodes. With such emulsions the permissible agitation during treatment often precludes the use of certain conventional treaters, and it is a primary object of the present invention to provide a treater in which this agitation is relatively small.

The invention also provides a structure which permits adjustment to alter the agitation of the emulsion in the electric field, and to vary the velocity of this emulsion, without changing the through-put of the treater. In addition, the present treater permits direct removal of the water particles from intermediate portions of the electric field thereby eliminating the difficulty heretofore encountered with certain types of treaters in forcing the coalesced phase completely through the electric field, thus increasing the tendency toward formation of low resistance paths.

The treater herein disclosed also permits the use of an auxiliary field which can be impressed upon the semi-conducting material which settles from the main treating field, thereby permitting settling and further treatment of the constituents in a field of lower intensity than that used for direct treatment. The treater is so designed that this auxiliary field can be set up between one of the electrodes and the water level at the bottom of the tank, this system having been found to be very effective in resolving the coarse emulsion which will settle from the main field during treatment.

One type of treater which is at present used on such "sludging" emulsions includes a live screen electrode suspended above the water level so that a secondary field is set up therebetween, the main field being above this screen electrode. With this type of treater the emulsion is introduced directly into the secondary field moving upward therein and through the interstices of the screen electrode to the main field. I have found that in some instances this secondary field causes "sludging" by acting upon the incoming emulsion to cause the coarse water particles to in effect act as secondary electrodes, thereby collecting certain smaller water particles. At the same time the field intensity cannot be maintained sufficiently high to permit coalescence of the agglomerated mass into globules of free water. In the present treater these difficulties are overcome and a greater through-put is made possible by directly introducing the incoming emulsion into the main field under such conditions as will prevent short-circuiting. At the same time the nozzle design of the present invention does not set up the agitation which is inherent in nozzles used in other types of treaters.

It is an object of the present invention to provide a treater and method having such characteristics as mentioned above.

A further object of the invention is to provide a treater and method wherein a stream of emulsion is directed through a horizontal field which permits removal of the coalesced constituents at a section intermediate the ends of the field.

Still a further object of the invention lies in directing a stream of emulsion through an electric field in spaced relationship with the electrode surfaces.

Further objects lie in the constructional details of the treater and will be apparent to those skilled in the art from the following description.

Referring to the drawing which illustrates the preferred embodiment of the invention,—

Fig. 1 is a vertical sectional view of the treater.

Fig. 2 is a sectional view taken on the line 2—2 of Fig. 1.

The treater includes a tank 10 including upper and lower heads 11 and 12.

A substantially flat upper electrode 15 is positioned in the tank 10 intermediate the heads 11 and 12 and is supported on rods 16 and a plurality of insulators 17. These insulators are in turn connected to rods 18 which extend through the head 11. These rods 18 are vertically adjustable with respect to the tank so as to control the position of the upper electrode 15. Such adjustment may be effected through any one of a number of means, the form shown including nuts 19 threaded to the upper ends of these rods.

The upper electrode 15 is preferably formed with a central opening 20 and provides two or more openings 22 near the periphery thereof which are preferably of U-shape, as best shown in Fig. 2. So also, this electrode is preferably provided with downward extending annular fins 23, 24, and 25 concentric with respect to the opening 26. The fins adjacent the periphery of the upper electrode 15 are progressively wider than the fins closer to the center of this electrode.

Positioned below the upper electrode 15 is a lower electrode 27 which is also substantially flat, this electrode cooperating with the upper electrode in defining a treating space 28. The lower electrode 27 is preferably interstitial in character, being formed of coarse mesh screen. A central opening 29 is provided, this opening being in alignment with the opening 20 of the upper electrode 15. Rods 32 are welded or otherwise secured to the electrode 27 near the periphery thereof and extend upward through the openings 22 of the upper electrode 15, being connected to insulators 33. These insulators are in turn supported by rods 34 which extend upward through the head 11 and are adjustable with respect thereto so as to permit adjustment of the spacing of these electrodes 15 and 27. In the preferred embodiment the rods 34 are threaded to receive nuts 35 so that rotation of these nuts will change the electrode spacing.

An electric field is established between these electrodes by any suitable means. Thus, the high voltage secondary winding of a transformer can be directly connected across these electrodes through conductors 37 and 38 respectively connected thereto and extending through bushings 39 and 40 in the conventional manner.

I have found it preferable, however, to utilize two transformers, or a transformer with a center-tapped secondary winding. In Fig. 1, I have illustrated two transformers 41 and 42 providing high voltage secondary windings which are interconnected and grounded as indicated by the numeral 43, being thereby connected to the tank 10, which is also grounded as indicated by the numeral 44. In addition, one of these high tension windings is connected to the conductor 37, while the other is connected to the conductor 38. The primary windings of these transformers are connected in parallel across a supply line 45. It is usually preferable to position a choke 46 in series with each primary winding to limit the current flowing therethrough. The transformers are connected in additive relation so that the potential between the electrodes 15 and 27 is substantially greater than the potential between either of these electrodes and the grounded tank, as will be readily apparent. The result is that a very intense field is established in the treating space 28, and auxiliary fields are established between these electrodes and the grounded tank.

In the normal operation of the treater a body of water is maintained in the bottom of the treater, the surface level of this body being indicated by the numeral 50. Inasmuch as this body of water is grounded to the tank 10, it follows that an auxiliary field is set up between the water level 50 and the lower electrode 27. The space in which this auxiliary field is set up is termed an auxiliary treating space 51 and the action taking place therein is very desirable with "sludging" emulsions, as will be hereinafter brought out.

The incoming emulsion is carried into the tank through a pipe 53 which is connected to a riser 54 extending upward through the opening 29 of the electrode 27. A lower plate 55 is connected to the upper end of this riser and provides a central opening through which the emulsion is conducted. Disposed above and in spaced relationship with the plate 55 is an upper plate 56 similar to the lower plate 55 except that it provides no central opening. This upper plate is supported on a rod 57 which extends upward through the opening 20 of the upper electrode 15 and through a guide 58 supported on arms 59. The upper end of the rod 57 extends through the head 11 and is adjustable with respect thereto by any suitable adjusting means. The means shown comprises a nut 60 positioned exterior of the tank and threaded to the upper end of the rod 57. Rotation of this nut thereby raises or lowers the upper plate 56 with respect to the lower plate 55, thus changing the distance across a discharge space 62 between these plates.

The plates 55 and 56 comprise a nozzle means directing the incoming emulsion outward in a horizontal plane. This plane is positioned intermediate the electrodes 15 and 27 so that the emulsion is moved outward in the treating space 28 in a radial direction. The emulsion thus tends to move transversely with respect to the fins 23, 24 and 25, and, if the fins are made of progressively larger size as shown in Fig. 1, the emulsion will be subjected to increasingly higher gradients as it moves outward in the treating space 28. Stated in other words, the electrodes 15 and 27 are closer to each other at their outer ends than they are at either of the inner ends so that the gradients in the outer portion of the treating space are greater than the gradients present in the inner portion of this treating space.

It will thus be clear that in the present invention the emulsion is introduced directly into the main treating space. As the emulsion moves outward therein coalescence of the dispersed water particles will take place. As soon as the water particles coalesce into masses of sufficient size to drop downward in the treating space 28, it will be clear that at least some of the coalesced water masses will drop through the interstitial electrode 27 and into the auxiliary treating space 51. These water masses are not ordinarily entirely pure, but still contain loosely associated oil. This oil is further separated from the water in the auxiliary treating space 51 due to the auxiliary field set up therein, the water being eventually separated from the oil and dropping to the body of water in the bottom of the treater whence it is withdrawn through a draw-off pipe 65. The dry oil rises to the upper end of the tank 10 whence it is withdrawn through a pipe 66.

With a constant throughput of emulsion it is possible to vary the agitation in the field and to vary the velocity of the emulsion discharging from the nozzle means by adjusting the vertical position of the rod 57. This is a very important advantage in that it permits the varying of these factors without varying the amount of emulsion being delivered to the treater.

In addition, an important feature of the invention lies in the adjustability of the electrodes 15 and 27. It will be noted that these electrodes can be individually adjusted, or both electrodes can be moved upward or downward with respect to the nozzle means. It has been found that the most desirable electrode spacing will vary with the emulsion undergoing treatment. So also, it has been found that the position of the nozzle means with respect to the electrodes changes the treating action. The most desirable positioning of this nozzle means is normally midway between the electrodes defining the treating space 28, but the most advantageous setting can be determined empirically.

Another feature and advantage of this nozzle and electrode structure is that it permits the introduction of the emulsion into the main field at a position spaced from either of the electrodes. In addition this stream is introduced substantially parallel to the electrodes, and its direction of flow is horizontal thereby not acting in opposition to any settling action of the water. These features tend to prevent shorting out of the electrodes, and tend to increase the rate of settling, thus increasing the effectiveness of treatment. It will also be noted that there is a fairly concentrated field between the nozzle structure and the other electrodes. The emulsion discharged from the nozzle is subjected to the action of this field. This, too, is an added feature of the present invention.

The type of nozzle means shown does not set up excessive agitation which would tend to further emulsify the incoming emulsion or which would tend to force the emulsion through the treating space 28 at such a high velocity as to interfere with proper treatment. It will be clear that the outward velocity of the emulsion is roughly inversely proportional to the square of the distance from the nozzle, so that the emulsion flows much slower in the outer portion of the treating space 28 than in the inner portion. Due to the fact that the emulsion in the outer portion of this space is drier than in the inner portion, this action is especially desirable in permitting the drier emulsion to be subjected to the action of the field for a longer period of time.

If desirable the incoming emulsion may be mixed with dry oil prior to the time that it moves through the pipe 53. On the other hand, it will be clear that a certain amount of dry oil will be drawn into the treating space 28 as indicated by the arrows 70 due to the injector action of the emulsion discharged between the plates 55 and 56. This dry oil will be to some extent mixed with the incoming emulsion in the treating space.

In some instances it is not necessary to utilize the fins 23, 24, and 25. These may be entirely dispensed with without detrimentally affecting the treating action when certain types of emulsions are undergoing treatment. With other types of emulsions, however, these fins form important auxiliary factors and serve to increase the treating action. So also, with certain emulsions it is possible to make the lower electrode 27 of solid character, allowing all of the water to move downward around the periphery thereof. In other instances it is possible to make the upper electrode 15 of an interstitial character thereby permitting a more direct movement of the dry oil upward into the upper portion of the tank.

I claim as my invention:

1. In combination in an electric treater: a pair of members providing outward-extending surfaces spaced from each other to define a discharge space having an annular mouth; means for supplying the emulsion to be treated to the central portion of said discharge space whereby a stream of said emulsion moves outward from said annular mouth; a pair of electrodes defining a treating space into which the emulsion discharged from said annular mouth moves; means spaced from said annular mouth so as to leave said annular mouth unobstructed for supporting said members; and means for establishing a potential difference between said electrodes.

2. In combination in an electric treater: a pair of electrodes spaced from each other to define a treating space, each of said electrodes defining a central opening; a pair of members positioned at a section between said electrodes; supporting means extending through the central opening of one of said electrodes and mounting one of said members; and an emulsion-delivery means extending through the central opening of the other of said electrodes and mounting the other of said members.

3. In combination in an electric treater: a tank; a pair of members spaced from each other to define an outward extending discharge space; pipe means communicating with the central portion of said discharge space to supply emulsion thereto; supporting means for the other of said members; means for movably mounting one of said members with respect to the other to adjust the distance between said members and thus control the thickness of the stream of emulsion issuing from said discharge space; and means for setting up an electric field in said tank and into which the stream of said emulsion moves.

4. In combination in an electric treater: a tank; a pair of members spaced from each other to define an outward extending discharge space; pipe means communicating with the central portion of said discharge space to supply emulsion thereto; supporting means for one of said members and extending to a position outside said tank; means operable from a position exterior of said tank for changing the position of said supporting means to adjust the distance between said members and thus control the thickness of the stream of emulsion issuing from said discharge space; and means for setting up an electric field in said tank and into which the stream of said emulsion moves.

5. In combination in an electric treater for treating emulsions: a tank; a pair of horizontally disposed electrodes in said tank, the upper of said electrodes providing a plurality of openings therethrough near the periphery thereof; supporting means for supporting the upper of said electrodes; supporting means extending downward near the periphery of said tank and through said openings of said upper electrode for supporting the lower of said electrodes; means for introducing the emulsion to be treated into the space between said electrodes; and means for establishing an electric field in said space between said electrodes.

6. A method of treating an emulsion by the use of a pair of electrodes, which includes the steps of: setting up a horizontally disposed electric field between said electrodes; introducing a stream of the emulsion to be treated into said field at a section intermediate said electrodes whereby said stream of emulsion flows in spaced relationship with each of said electrodes; and separating the constituents of said emulsion.

7. A method of treating an emulsion of oily material and water, which includes the steps of: setting up a horizontally disposed electric field; introducing a stream of emulsion into the central portion of said field, said stream flowing radially outward toward the periphery of said field, the water particles in said emulsion being coalesced by the action of said electric field; and removing at least certain of said coalesced water particles from said field between said central portion and said peripheral portion whereby the water content of the liquid in the outer portion of said field is substantially lower than in said central portion.

8. In combination in an electric treater for treating emulsions to separate the phases thereof: discharge means including a pair of members spaced from each other to define a discharge space having an annular mouth; means for supplying an emulsion to said discharge space whereby a stream of said emulsion moves outward from said annular mouth; means including a pair of substantially horizontal electrodes defining a treating space into which said stream of emulsion moves, said electrodes being spaced from said members; means for insulating said electrodes from each other and from each of said members; and means for establishing a potential difference between said electrodes and between said electrodes and each of said members, said fields coalescing the dispersed phase of said emulsion.

9. In combination in an electric treater for treating emulsions to separate the phases thereof: a tank containing a body of conducting liquid in the lower end thereof; a lower interstitial electrode positioned above the surface of said body of conducting liquid; an upper electrode above said lower interstitial electrode and cooperating therewith in defining a treating space; means for establishing a potential difference between said electrodes to set up an electric field in said treating space; an annular discharge means in said treating space and discharging a stream of emulsion thereinto in a direction substantially parallel to said electrode, the dispersed phase of said emulsion being coalesced by said electric field to form masses which move downward toward said lower interstitial electrode and through the interstices thereof into the zone between said lower electrode and said surface of said body of conducting liquid; and means for establishing an electric field in said zone to further treat said coalesced masses.

10. A combination as defined in claim 9 in which said annular discharge means is insulated from each of said electrodes whereby a difference of potential is maintained between said annular discharge means and said electrodes whereby the emulsion particles may be subjected to electric fields between said annular discharge means and said electrodes, between said electrodes themselves, and between said lower interstitial electrode and said surface of said body of conducting liquid in said tank.

11. In combination in an electric treater for emulsions: a tank; emulsion-distribution means for forming a flat stream of emulsion flowing outwardly and substantially horizontally from all sides of the axis of said tank in a direction toward said tank whereby said emulsion is acted upon by gravitational forces in flowing toward said tank, said means including a pair of members providing upper and lower surfaces vertically spaced from each other to define an annular mouth forming the emulsion into said flat stream flowing outward toward said tank; means for delivering emulsion to said emulsion-distribution means; an upper electrode positioned at a level above the uppermost portion of said flat stream of emulsion discharging from said annular mouth and spaced therefrom; a lower electrode positioned at a level below the lowermost portion of said flat stream of emulsion discharging from said annular mouth and spaced therefrom, said electrodes forming an outward-extending treating space into which said flat stream of emulsion moves in spaced relationship with each electrode; and means for establishing an electric field between said electrodes of sufficient intensity to treat said emulsion moving toward said tank in said treating space.

12. In combination in an electric treater for treating emulsions to separate the phases thereof: a tank providing a vertical axis; emulsion-distribution means for moving a flat outward-flowing stream of emulsion from said axis toward said tank in substantially a horizontal direction, said emulsion-distribution means including two outward-extending surfaces spaced from each other to define a mouth forming said flat stream; means for delivering emulsion to said emulsion-distribution means; means for electrically treating said stream of emulsion during its outward flow to coalesce the dispersed droplets thereof into masses large enough to gravitate from said outward-flowing stream, said means including two substantially horizontal electrodes extending outward from said axis and spaced from each other to define an outward-extending treating space into which said flat stream of emulsion moves; and means for removing at least a part of said coalesced masses from said emulsion constituents before discharge from the peripheral portion of said treating space, said means including a plurality of openings in that electrode toward which said coalesced masses move for directly removing said coalesced masses from said treating space.

13. A method of treating an emulsion by the use of a pair of electrodes defining a substantially horizontal space open at one end, one electrode being of interstitial character, which method includes the steps of: establishing a difference of potential between said electrodes to establish an electric field in said space of sufficient intensity to coalesce the dispersed phase of said emulsion into masses of sufficient size to gravitationally move toward said interstitial electrode; and moving a stream of emulsion into said space in substantially a horizontal direction and in a direction toward said open end of said space at such velocity that at least a portion of the coalesced masses are directly removed from said space through the interstices of said electrode prior to the time that the treated emulsion constituents reach said open end of said space.

CLAUDIUS H. M. ROBERTS.